P. LORD.
GEARING.
APPLICATION FILED OCT. 25, 1911.
1,053,099.
Patented Feb. 11, 1913.
3 SHEETS—SHEET 1.
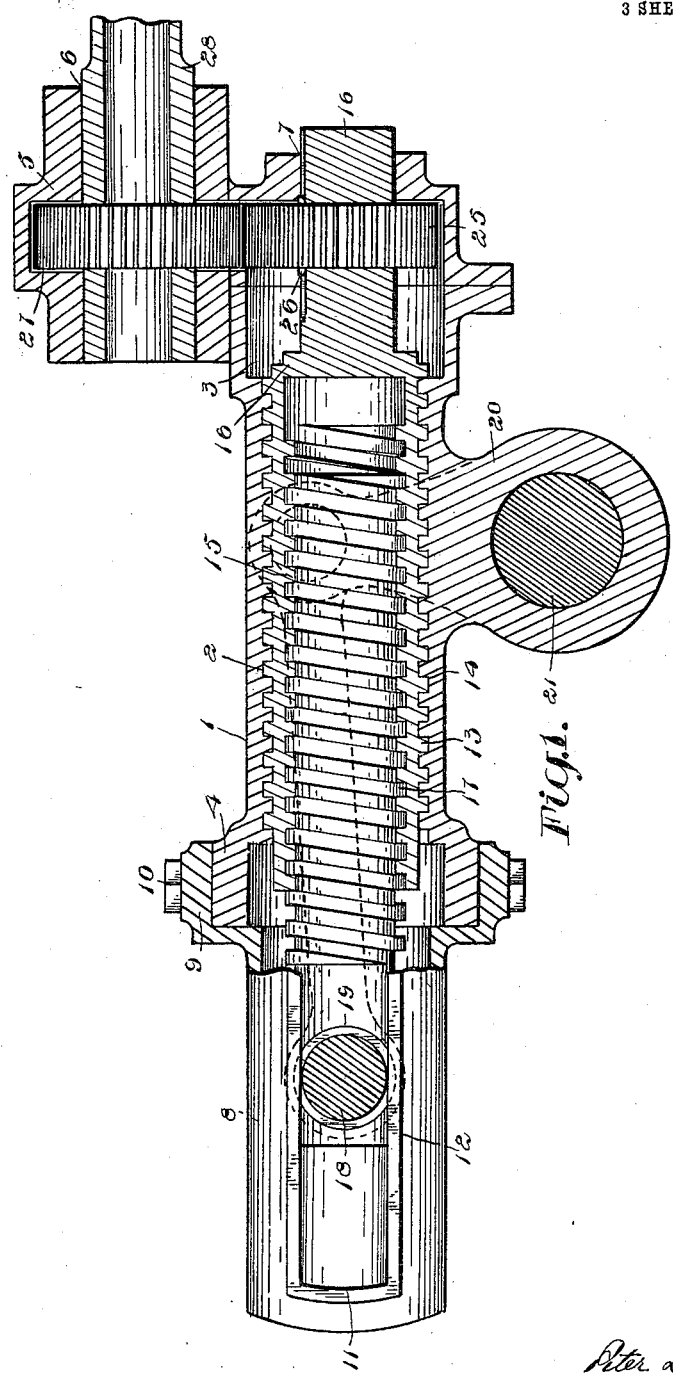
Witnesses
Inventor
Peter Lord
Attorney

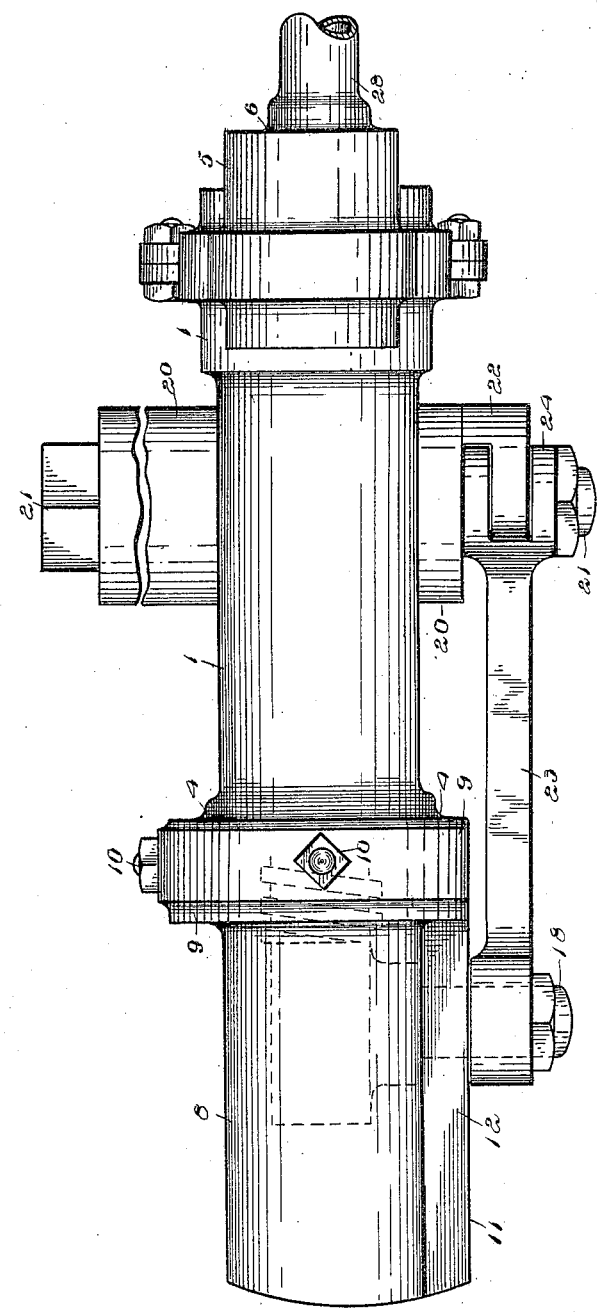

P. LORD.
GEARING.
APPLICATION FILED OCT. 25, 1911.

1,053,099.

Patented Feb. 11, 1913.
3 SHEETS—SHEET 3.

UNITED STATES PATENT OFFICE.

PETER LORD, OF MONTREAL, QUEBEC, CANADA.

GEARING.

1,053,099.  Specification of Letters Patent.  Patented Feb. 11, 1913.

Application filed October 25, 1911. Serial No. 656,741.

*To all whom it may concern:*

Be it known that I, PETER LORD, resident of 140 Berri street, in the city and district of Montreal, in the Providence of Quebec, in the Dominion of Canada, a subject of the King of Great Britain, have invented certain new and useful Improvements in Gearing; and I do hereby declare that the following is a full, clear, and exact description of the same.

The invention relates to improvements in gearing, as described in the present specification and illustrated in the accompanying drawings that form part of the same.

The invention consists essentially in the novel construction and arrangement of parts whereby screw members coact in telescopic form so that one of said members travels at a much greater speed than the prime mover.

The objects of the invention are to effect greater efficiency in steering gear, lifting machines and like devices, to secure a reliable lock, particularly for steering gear by means of which no matter what position the prime mover may be in, it will remain in such position until manually or otherwise operated and consequently the parts which are moved thereby, and generally to devise a compact, comparatively cheap, and simple mechanism for the purposes aforesaid.

Figure 4:
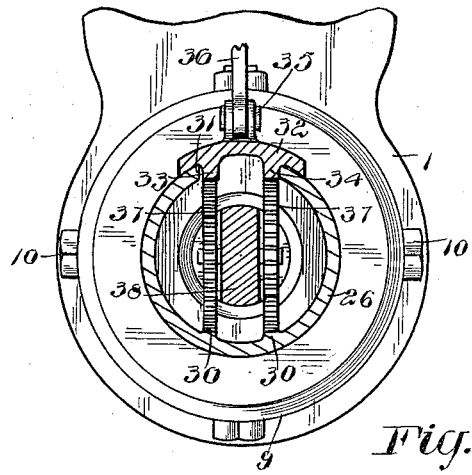
Figure 3:
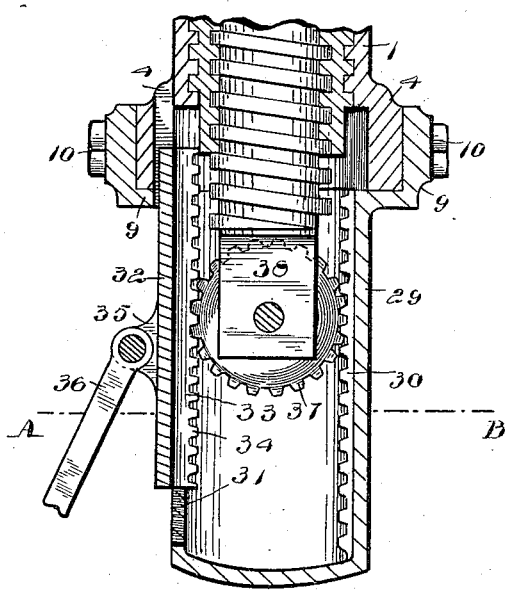

In the drawings, Figure 1 is a longitudinal sectional view of the gearing. Fig. 2 is a side elevation of the complete device. Fig. 3 is a longitudinal sectional view of the gearing, broken away, showing an additional mover for the purpose of increasing the speed. Fig. 4 is a cross sectional view of the part illustrated in Fig. 3, on the line A—B in said figure.

Like numerals of reference indicate corresponding parts in each figure.

Referring to the drawings, 1 is the outer casing in barrel form, having in the interior wall thereof screw threads 2 terminating at one end in the gear chamber 3 and at the other end in the inwardly recessed flange 4 forming one member of the joint, said gear chamber supporting on one side thereof, and communicating therewith, the gear box 5, said gear box 5 having the bearings 6 and said gear chamber 3 having the bearings 7, the latter being central in alinement with the interior of the casing 1.

8 is an extension from the flanged end of the casing 1 and of barrel form and having a corresponding flange 9 joining the other joint member to the flange 4, said flange being securely connected together by the bolt and nut members 10, said extension member 8 having the longitudinal opening 11 at one side thereof from the edges of which extend the flanges 12 forming slide-ways.

13 is a hollow screw having on the outer wall a right hand thread 14 and on the inner wall a left hand thread 15, said right hand thread 14 turning in the thread 2 of said outer casing 1 and said screw 13 terminating at one end in the solid and reduced head 16, said head extending through the bearing 7, thus the screw 13 may travel back and forth in the casing 1, said head 16 sliding inwardly and outwardly in the bearing 7.

17 is a threaded rod turning in the left hand thread 13 and terminating at one end in the off-set crank pin 18, said crank pin extending through the opening 11, being supported within said opening in the sliding journal box 19.

20 is a bearing, rigidly supported from the outer casing 1 and preferably forming part therewith.

21 is a shaft journaled in the bearing 20 and arranged at right angles to the casing 1.

22 is a crank fixedly mounted on the shaft 21 connected with the pin 18 by the rod 23, said rod being pivotally secured to said pin 18 and to said crank 22 by the forked end 24, in order to permit sufficient play in the operation. This is common practice and need not be shown or described further herein as there is no novelty claimed.

25 is a gear wheel mounted on the reduced head 16 and secured from rotation by the feather 26, though permitting the said head to slide back and forth therethrough.

27 is a gear wheel mounted on the shaft 28, the latter shaft being journaled in the bearings 6, said gear wheel 27 coacting with the gear wheel 25 and arranged approximately two to one, thus it will be seen on turning the shaft 28 on which may be mounted the wheel of a steering gear, if the invention is used in that particular work, the said gear wheel coacting with the gear wheel 25 turns the latter and consequently the hollow screw 13, and as the said hollow screw screws within the outer casing 1, it is moved to the extent of the operation of the prime mover in proportion to the gear connections.

The turning of the hollow screw 13 will cause the threaded rod 17 to travel and the speed of travel of the said rod 17 will be just twice the speed of travel of the said hollow screw, thereby moving the pin 18 the greater distance and consequently imparting to the crank 22 a maximum movement.

In Figs. 3 and 4, a modified form of the invention is shown, and in this the speed and extent of the operation of the crank is further increased in relation to the movement of the prime mover.

29 is the extension piece, replacing the extension 8 and having in the interior thereof the fixed rack 30 on one side directly opposite to the opening 31.

32 is a sliding rack, having the flanges 33 extending over the exterior wall of the extension 29 and the teeth 34 extending into the opening 31, in addition having the lugs 35 pivotally secured by the rod 36 to the crank 22.

37 is a pinion journaled at the end of the threaded rod 38, said threaded rod 38 corresponding to the threaded rod 17 and said pinion 37 coacting with the fixed rack 30 and the sliding rack 32 and imparting movement to the latter. It will be thus seen that on the movement of the threaded rod 38, in a similar manner to the movement of the threaded rod 17, the pinion 37 coacting with the fixed rack imparts to the sliding rack 32 an additional movement which increases the speed and distance traveled by the crank 22 in relation to the prime mover represented by the shaft 21.

In further explanation of the operation of this invention, it may here be briefly stated that in using this device as a steering gear for automobiles, boats or any other conveyance, the shaft 28 represents the manually operated part. The rotation of this shaft turns the gear 27 which operates the gear 25 and as the said gear is mounted on the reduced head 16, the hollow screw 13 is turned within the outer casing 1 and as the thread in the interior of this hollow screw is opposite to the exterior thread, the threaded rod within said hollow screw is caused to travel in the same direction as the said hollow screw thereby itself, that is to say, the threaded rod travels its own distance within the hollow screw and at the same time travels with said hollow screw, thus doubling the speed of the rotation of the crank by moving it a greater distance as compared with the prime mover.

In further increasing the speed, the pinion 37 is added and with its coacting racks, adds to the speed of the movement in relation to the prime mover, by causing the crank to move a still greater proportion of distance.

What I claim as my invention is:

1. In gearing, a prime mover, a secondary screw member rotated by said prime mover, a fixed member in which said secondary member screws and travels and a third screw member within the said secondary member and adapted to travel of itself in the same direction as said secondary member during the operation of the latter by means of said prime mover.

2. In gearing, a prime mover, a secondary member operatively connected to said prime mover and in the form of a hollow screw having inside and outside threads of an opposite nature, a casing having a thread in the inner wall thereof corresponding to the outer thread of said hollow screw and chambers at the end thereof inclosing operating parts between said prime mover and said secondary member and a threaded rod within said hollow screw and adapted to travel of itself and with said hollow screw on operation by means of said prime mover.

3. In gearing, a casing having gear chambers at one end thereof, a shaft forming the prime mover journaled in one of said gear cases, a gear mounted on said shaft, a hollow screw having interior and exterior threads of an opposite nature and screwed into said casing and having a reduced head extending through one of said gear chambers, a gear mounted on said reduced head coacting with the aforesaid gear and a threaded rod screwed into the interior of said hollow screw and adapted to travel coincidently with said hollow screw and additionally through its own threaded connection.

4. In gearing, an internally threaded casing of barrel form having at one end thereof gear chambers, a shaft journaled in one of said gear chambers and forming a prime mover, a gear mounted on said shaft, a hollow screw having right and left hand threads on the exterior and interior respectively and turning within said barrel casing, said screw at its reduced head portion extending through one of the gear chambers and the end of the casing, a gear slidably and non-rotatively mounted on said head and coacting with the aforesaid gear, and a threaded rod correspondingly threaded to the interior of said hollow screw.

5. In gearing, an internally threaded casing of a barrel form having at one end thereof gear chambers, an extension to one end of said casing, a shaft journaled in one of said gear chambers, a gear mounted on said shaft, a hollow screw having right and left hand threads on the exterior and interior respectively, a reduced head extending through one of said gear chambers and the end of the casing, a gear mounted on said reduced head coacting with the aforesaid gear, a threaded rod screwing within said hollow screw and projecting into said extension and having an off set pin in the end thereof extending through the side of the casing, a bearing rapidly connected with said casing, a shaft journaled in said bearing, a crank mounted on said shaft, and a rod connecting said crank with said pin.

6. In gearing, an internally threaded casing having gear chambers at one end thereof, said barrel leading into one of said gear chambers, a hollow screw having interior and exterior threads of an opposite nature and a solid head of reduced form extending through one of said gear chambers and through the end of the casing, a shaft journaled in one of said gear chambers, a gear wheel mounted on said shaft, a coacting gear wheel mounted on said reduced head of the hollow screw and slidable longitudinally thereon, an extension suitably bolted to said barrel portion of the casing having a longitudinal opening therethrough and flanges extending from said opening, a journal bearing slidably arranged between said flanges, a threaded rod screwing within said hollow screw and having at one end thereof an offset pin extending through said slidable journal bearing, a bearing rigid with said casing, a shaft journaled in said bearing at right angles to said casing, a crank mounted on said shaft, and a rod pivotally connecting the aforesaid pin and said crank.

Signed at Montreal, Quebec, Canada, this 17th day of October, 1911.

PETER LORD.

Witnesses:
G. H. TRESIDDER,
H. R. GAYLOR.

---

Copies of this patent may be obtained for five cents each, by addressing the "Commissioner of Patents, Washington, D. C."